July 12, 1949. C. F. BENDER 2,476,021
PACKING
Filed Feb. 11, 1946
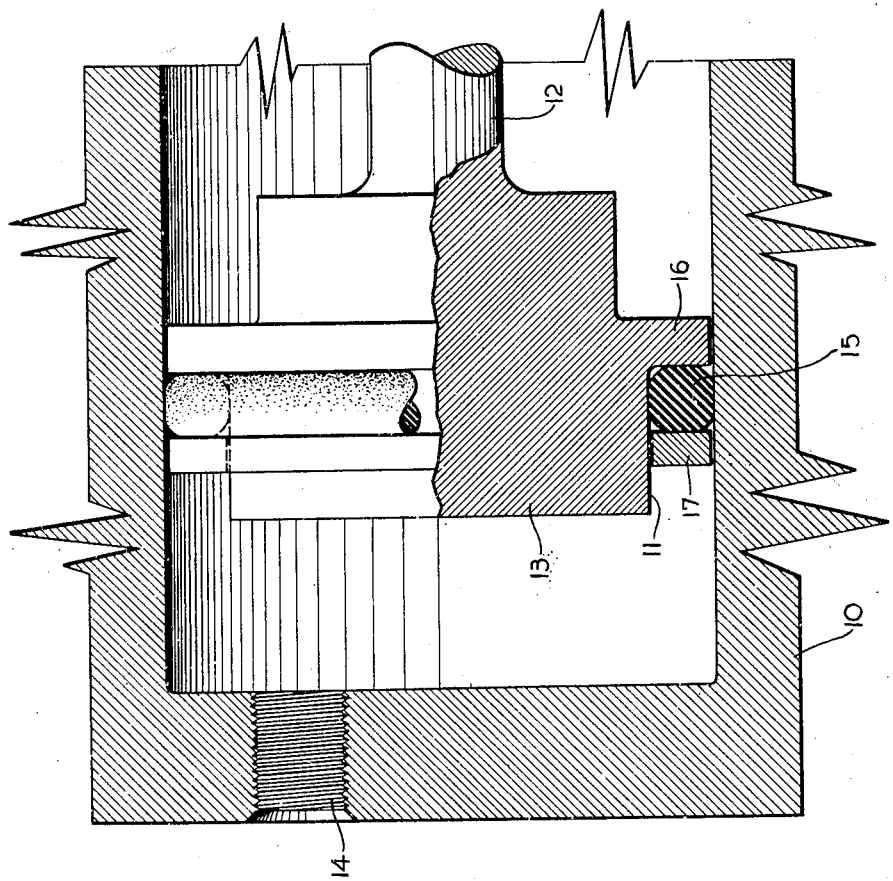
Inventor
Charles F. Bender
By R. H. Waters
Attorney Patented July 12, 1949

2,476,021

UNITED STATES PATENT OFFICE 2,476,021

PACKING

Charles F. Bender, Akron, Ohio, assignor to Wingfoot Corporation, Akron, Ohio, a corporation of Delaware Application February 11, 1946, Serial No. 646,814

5 Claims. (Cl. 309—23)

This invention relates to packing, and more specifically, to means for preventing leakage between a piston and a cylinder in which the piston reciprocates.

As is well known, many packing materials and constructions have been proposed heretofore. However, known packings, for example, for use between a piston and cylinder, may not be suitable for use in high speed pistons, or may permit leakage at high pressures or speeds, or may not have the desired length of life, or may require careful machining and operating tolerances. Again, many known packings are costly and complicated to manufacture, install and maintain.

It is the general object of this invention to avoid and overcome the foregoing and other difficulties of prior known packing combinations by providing an improved, less expensive type of packing construction.

Another object of the invention is the provision of a simple, durable packing construction especially adapted for use with pistons having a short reciprocal movement.

A further object of the invention is to maintain a flexible pressure on a resilient packing ring as to urge it into oval shape and sealing position.

Yet another object is to provide a force on a packing urging it into sealing position, which force is directly proportionate to the pressure being sealed by the packing.

Another object of the invention is to provide a packing that automatically compensates for wear on its sealing surface.

The foregoing objects of the invention, and other objects which will become apparent as the description proceeds, are achieved by the combination of a cylinder and piston, wherein the piston has a shoulder formed thereon, with a resilient ring received on the piston and abutting the shoulder formed thereon, and a floating washer associated with the piston and adapted to force the ring against the shoulder and out against the associated cylinder wall when pressure is set up in the cylinder.

For a better understanding of the invention, reference should be had to the accompanying drawings, wherein the single figure is a cross-section, partly in elevation, of a piston and cylinder illustrating one embodiment of the invention.

Referring specifically to the drawing, a cylinder 10 is shown which has a piston 11, connected to a piston rod 12, positioned therein for reciprocation. The pressure face 13 of the piston, which is appreciably smaller in diameter than the cylinder, forms a chamber with the end of the cylinder 10, and any desired pressure medium is moved into or out of the chamber through a cylinder opening 14. It will be understood that the details of the cylinder and piston have been rather diagrammatically shown inasmuch as the invention is concerned with the packing combination.

In order to seal the piston 11 in the cylinder, a resilient "O" ring 15, of normally round cross section and made from rubber or rubber-like material, is positioned around the piston. The ring 15 is normally stretched slightly when positioned on the piston, and it is originally usually slightly larger in outer diameter than the inner diameter of the cylinder 10. Thus, when mounted in sealing position, the normally round cross-section of the ring 15 is flattened to oval shape. The ring 15 is positioned with relation to the piston by a continuous flange or shoulder 16 formed integrally with the piston and extending perpendicularly therefrom to form a ring of just slightly smaller diameter than the inner diameter of the cylinder to have sliding clearance therewith.

It is possible to employ only the ring 15 as a seal, but an important feature of the invention is to employ a floating washer 17 made of leather or preferably metal in conjunction with the ring. The application of force to the piston 11 through the rod 12 to move the piston in a fluid-compressing direction, or any increases in pressure in the fluid in the cylinder even though the piston does not move, results in a surge of pressure against the washer 17 to force it into engagement with the ring 15. This further compresses the ring against the cylinder and piston during the pressure cycle. The clearance between the washer 17 and the piston and cylinder is exaggerated in the drawings. Actually it is a close, sliding clearance, so that even though the fluid pressure gradually works between the washer and ring 15, there is always a preponderance of pressure holding the washer against the ring. However, it is true that upon the return or non-pressure stroke of the piston, the extra sealing pressure on the ring 15 is largely removed and wear on the ring is reduced. In fact, the combination described has been found to effect an excellent seal even after extensive operation and wear.

The packing of the invention has been especially satisfactory for use with pistons having very limited travel, such as those used in some types of brakes where the piston only moves .030 of an inch or less. Wide temperature variations have not affected the packing in use with pressures up to about 600 lbs. per square inch.

Thus it is seen that an improved packing has been provided and the objects of the invention have been achieved.

The improved packing is characterized by simplicity and inexpensiveness, of construction and maintenance, and by high efficiency and long life. Close tolerances are avoided and various degrees of swell of the ring 15 when subjected to braking fluids do not adversely affect the excellence of the sealing action obtained. This is because the washer 17 adjusts itself to take care of any change of size or any difference in size in the ring due to wear or swell.

While in accord with the Patent Statutes, one embodiment of the invention has been specifically illustrated and described, it should be clearly understood that the scope of the invention is not limited thereto or thereby, but is defined in the appended claims.

What is claimed is:

1. The combination of a cylinder and piston, wherein the piston has a shoulder formed thereon, with a resilient ring received on the piston and abutting the shoulder formed thereon, and a floating washer associated with the piston and forcing the ring against the shoulder and out against the associated cylinder wall, the washer having an exposed face to which the full fluid pressure of the cylinder is continuously applied.

2. In a packing, the combination of a cylinder having a fluid pressure set up therein, a piston slidable in the cylinder, said piston having an annular shoulder extending therefrom at a right angle thereto near the pressure end of the piston, a resilient ring associated with the piston on the pressure side of the shoulder, and a flat-faced freely positioned annular washer telescoped over the end of the piston into contact with the ring, the outer diameters of the shoulder and washer having a sliding fit in the cylinder, said washer being forced by fluid pressure in the cylinder against the ring to force it against the shoulder and into firmer sealing contact with the cylinder, said washer having the full fluid pressure of the cylinder exerted on its exposed side at all times, said washer being associated with a relatively long reduced diameter piston section in relation to the length of the piston stroke.

3. In a packing for a piston having limited movement, which piston has an annular shoulder formed on its side wall, a resilient ring positioned around the piston and extending slightly beyond the shoulder but abutting a face of the shoulder on the pressure side thereof, and a freely positioned flat-faced washer with one face abutting the ring to press it against the shoulder and into firmer sealing relation with any member in which the piston is positioned, said washer having an exposed face which is at all times subject to the full pressure set up in the member in which the piston is positioned, said ring being in telescoped engagement with a reduced diameter portion of the piston of appreciably greater axial length than the length of the piston stroke.

4. A packing combination including a cylinder member having a fluid pressure therein, a piston member slidably received in the cylinder member, and packing means between the members, said means including a resilient O-ring received and carried by one of the members and compressed between the members, a shoulder on said member carrying the O-ring against which shoulder the O-ring abuts, and a washer having close sliding contact with both members and received and carried by the member carrying the O-ring, said washer abutting with the side of the O-ring remote from the shoulder and being of substantially the same diameter as the O-ring, said washer having an exposed face subject at all times to the full fluid pressure in said cylinder member.

5. In combination, a cylinder, a piston slidably received in the cylinder, a resilient ring of substantially round cross section compressed between the piston and cylinder, the ring being expanded to engage with the piston to form a seal therewith, a shoulder on the piston for holding the ring against movement relative to the piston on the pressure stroke of the piston and against which the ring abuts, and a washer having close sliding clearance with the piston and cylinder and abutting with the side of the ring opposite the shoulder, said washer being held against the ring soley by fluid pressure in said cylinder to which said washer is exposed at all times.

CHARLES F. BENDER.

REFERENCES CITED

The following references are of record in the file of this patent:

UNITED STATES PATENTS

| Number | Name | Date |
|---|---|---|
| 1,517,593 | Slate | Dec. 2, 1924 |
| 1,686,090 | MacClatchie | Oct. 2, 1928 |
| 1,964,745 | Sauzedde | July 3, 1934 |
| 2,115,383 | Christensen | Apr. 26, 1938 |
| 2,185,991 | Voorhies | Jan. 2, 1940 |
| 2,287,456 | Springston | June 23, 1942 |
| 2,349,170 | Jackman | May 16, 1944 |